(12) United States Patent
Hihara et al.

(10) Patent No.: US 8,741,240 B2
(45) Date of Patent: Jun. 3, 2014

(54) SELECTIVE REDUCTION CATALYST, AND EXHAUST GAS PURIFICATION DEVICE AND EXHAUST GAS PURIFICATION METHOD USING SAME

(75) Inventors: Takashi Hihara, Shizuoka (JP); Tomoaki Ito, Shizuoka (JP); Yasushi Tanaka, Shizuoka (JP); Makoto Nagata, Shizuoka (JP)

(73) Assignee: N.E. Chemcat Corporation, Tokyo (JP)

( * ) Notice: Subject to any disclaimer, the term of this patent is extended or adjusted under 35 U.S.C. 154(b) by 0 days.

(21) Appl. No.: 13/884,164

(22) PCT Filed: Sep. 21, 2011

(86) PCT No.: PCT/JP2011/071414
§ 371 (c)(1),
(2), (4) Date: May 8, 2013

(87) PCT Pub. No.: WO2012/090557
PCT Pub. Date: Jul. 5, 2012

(65) Prior Publication Data
US 2013/0230441 A1   Sep. 5, 2013

(30) Foreign Application Priority Data
Dec. 27, 2010  (JP) ................. 2010-290311

(51) Int. Cl.
*B01D 53/94* (2006.01)
*B01J 21/06* (2006.01)
*B01J 23/10* (2006.01)
*B01J 23/745* (2006.01)
*B01J 29/00* (2006.01)
*F01N 3/28* (2006.01)

(52) U.S. Cl.
USPC .............. 423/213.2; 423/213.7; 423/239.1; 423/239.2; 502/60; 502/64; 502/338; 502/232; 502/305; 502/304; 502/349; 60/274; 60/299; 60/301

(58) Field of Classification Search
USPC ........... 502/60, 64, 338, 232, 305, 304, 349; 423/213.2, 213.7, 239.1, 239.2; 60/274, 299, 301
See application file for complete search history.

(56) References Cited

U.S. PATENT DOCUMENTS 7,985,391 B2 *  7/2011  Collier et al. ............. 423/239.1
(Continued)

FOREIGN PATENT DOCUMENTS

JP        05-038420 A    2/1993
(Continued)

OTHER PUBLICATIONS

Nova, Isabella et al., "NH3—NO/NO2 chemistry over V-based catalysts and its role in the mechanism of the Fast SCR reaction", Catalysis Today, vol. 144, 2006, pp. 3-12.

(Continued)

*Primary Examiner* — Timothy Vanoy
(74) *Attorney, Agent, or Firm* — Westerman, Hattori, Daniels & Adrian, LLP

(57) ABSTRACT

The selective reduction-type catalyst effectively purifies nitrogen oxides contained in exhaust gas from a lean-burn engine such as a boiler, a gas turbine or a lean-burn engine, a diesel engine, even under high SV, as well as having small pressure loss, by supplying by spraying urea water or ammonia water, as a reducing component, to the selective reduction-type catalyst; and an exhaust gas purification apparatus along with an exhaust gas purification method using the same. The selective reduction-type catalyst for selectively reducing a nitrogen oxide by adding urea or ammonia as a reducing agent of the nitrogen oxide to exhaust gas discharged from a lean-burn engine, characterized by coating a catalyst layer including zeolite containing at least an iron element, and a composite oxide of silica, tungsten oxide, ceria and zirconia, as denitration components, at the surface of a monolithic structure-type substrate.

16 Claims, 2 Drawing Sheets

(56) References Cited

U.S. PATENT DOCUMENTS

| | | | |
|---|---|---|---|
| 2009/0269265 A1* | 10/2009 | Ando et al. | 423/239.2 |
| 2010/0247407 A1* | 9/2010 | Larcher et al. | 423/213.2 |
| 2013/0164201 A1* | 6/2013 | Hernandez et al. | 423/213.2 |
| 2014/0044635 A1* | 2/2014 | Ito et al. | 423/239.1 |

FOREIGN PATENT DOCUMENTS

| | | |
|---|---|---|
| JP | 2002-0502927 A | 1/2002 |
| JP | 2005-111436 A | 4/2005 |
| JP | 2005-238196 A | 9/2005 |
| JP | 2008-049290 A | 3/2008 |
| JP | 2009-262098 A | 11/2009 |
| JP | 2009-538736 A | 11/2009 |
| WO | 99/39809 A1 | 8/1999 |
| WO | 2008/085280 A2 | 7/2008 |
| WO | 2009/080152 A1 | 7/2009 |

OTHER PUBLICATIONS

International Search Report of PCT/JP2011/071414, mailing date of Nov. 29, 2011.

* cited by examiner

SELECTIVE REDUCTION CATALYST, AND EXHAUST GAS PURIFICATION DEVICE AND EXHAUST GAS PURIFICATION METHOD USING SAME

TECHNICAL FIELD

The present invention relates to a selective reduction-type catalyst, and an exhaust gas purification apparatus along with an exhaust gas purification method using the same, and in more detail, the present invention relates to a selective reduction-type catalyst which is capable of purifying effectively nitrogen oxides contained in exhaust gas from a lean-burn engine such as a boiler, a gas turbine or a lean-burn engine such as a lean-burn-type gasoline engine, a diesel engine, by supplying by spraying urea water or ammonia water, as a reducing component, to the selective reduction-type catalyst, even under condition from low temperature to high temperature, and as for space velocity (it may also be referred to as SV), from high SV (30 k/hr to 60 k/hr) to ultra high SV (60 k/hr or higher), and is superior in heat resistance, as well as having small pressure loss; and an exhaust gas purification apparatus along with an exhaust gas purification method using the same.

BACKGROUND ART

Exhaust gas discharged from a lean-burn engine contains various harmful substances derived from fuel or combustion air. Such harmful substances include a hydrocarbon (HC), a Soluble Organic Fraction (it may also be referred to as SOF), soot, carbon monoxide (CO), a nitrogen oxide ($NO_x$) and the like, and regulations on discharge amount of these harmful substances have been tightening year by year. As a purification method for such harmful substances, a purification method by contacting exhaust gas to a catalyst has been practically applied.

In addition, in such a lean-burn engine, there has been investigated suppression of generation amount of the harmful substances by controlling kind, supply amount and supply timing of fuel, amount of air or the like. However, a conventional catalyst or control method has not been possible to purify exhaust gas in a satisfactory level. In particular, because of easy discharge of a nitrogen oxide in a lean-burn engine, as well as in view of ever tightening of regulations thereof, existing purification technology of $NO_x$ is difficult to suppress discharge of the harmful substances, in the case of a diesel engine to be mounted on an automobile, due to always changing operation condition thereof.

As the one using a catalyst among technology (denitration technology) for purifying $NO_x$, there has been known a technology for reductive denitration by making exhaust gas comprising $NO_x$ contacted with a selective reduction catalyst having vanadium oxide, zeolite or the like, as a main component, under the presence of an ammonia ($NH_3$) component, as a selective reduction method, or Selective Catalytic Reduction (hereafter may be called SCR).

In this SCR, where the $NH_3$ component is used as a reducing agent, $NO_x$ is finally reduced to $N_2$ mainly by the following reaction equations (1) to (3):

  (1)

  (2)

  (3)

In denitration in exhaust gas, in the above denitration reactions (1) to (3), molar ratio of $NH_3/NO_x$ is enough to be 1.0 theoretically, however, in the case of transitional engine operation condition in operation of a diesel engine, or in the case where space velocity, temperature of exhaust gas, and temperature of the catalyst surface are not suitable, in order to obtain sufficient denitration performance, there may be the case where ratio of $NH_3/NO_x$ of $NH_3$ to be supplied should be increased inevitably, resulting in leakage of unreacted $NH_3$, therefore inducing risk of secondary pollution such as new environmental contamination or the like has been pointed out. Hereafter, $NH_3$ leakage may be referred to as slip or $NH_3$ slip.

In such a denitration catalyst system, $NH_3$ gas may be used as the reducing component, however, $NH_3$ itself has irritating odor or harmful property. Therefore, there has been proposed a system for adding urea water, as the $NH_3$ component, from the upstream of a denitration catalyst, generating $NH_3$ by pyrolysis or hydrolysis, and having this acted as a reducing agent to exert denitration performance.

Reactions for obtaining such a $NH_3$ by decomposition of urea are as the following (4) to (6):

  (4; pyrolysis of urea)

  (5; hydrolysis of isocyanic acid)

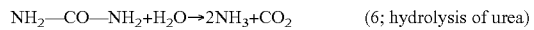  (6; hydrolysis of urea)

Urea is supplied by spraying as urea water from the upstream of the SCR catalyst. As described above, because the one which contributes to reductive purification of $NO_x$ is mainly $NH_3$, a reaction of $NO_x$ in the SCR catalyst is influenced by decomposition efficiency of urea. Low decomposition efficiency of urea not only decreases efficiency of $NO_x$ purification but also increases use amount of urea, and could induce $NH_3$ slip caused by unreacted urea.

As for such $NH_3$ slip, for oxidative purification of slipped $NH_3$, it was necessary to arrange an oxidation catalyst at the later stage of the SCR catalyst. However, arrangement of such a catalyst for purification of slipped $NH_3$ leads to increase in cost, and it was difficult to secure mounting site of the catalyst, in particular, in an automobile.

In addition, increase in amount of slipped $NH_3$ requires high oxidation capability to the catalyst, and it was necessary to use a large amount of a valuable noble metal such as platinum, which is an activated specie.

In purification of $NO_x$ by the $NH_3$ component, the reaction is promoted under atmosphere containing NO and $NO_2$, each in an amount of roughly half, as in the above formula (3) (NON PATENT DUCUMENT 1). However, most of the $NO_x$ component discharged from a lean-burn engine is nitrogen monoxide (NO) (PATENT DUCUMENT 2). Therefore, for efficient purification of $NO_x$, there has been proposed to arrange an NO oxidation means in a flow passage of exhaust gas, in order to increase concentration of the $NO_2$ component in exhaust gas (PATENT DUCUMENT 2).

There has also been proposed a method for purifying harmful fine particle components and NO at the same time by a single catalyst system, by utilization of such an NO oxidation means. One of them is arrangement of the oxidation catalyst, a filter, the SCR catalyst in a flow passage of exhaust gas, in this order, and spraying of an ammonia component at the front stage of the SCR catalyst (refer to PATENT LITERATURE 3).

In addition, because exhaust gas from a gas turbine or a gas engine has high temperature and high SV (space velocity), removal of NO under such conditions has been a problem for catalytic action of the selective catalytic reduction (SCR). As a catalyst for performing selective catalytic reduction of a nitrogen oxide using ammonia at an exhaust temperature over about 300° C., there has been proposed the SCR catalyst comprising the first component containing zeolite, the second component composed of each substance such as cerium, iron, copper, or a mixture thereof, and an oxygen storage substance (refer to PATENT LITERATURE 1). As this SCR catalyst, there has been exemplified in Example, a "cerium-mixed wash-coat catalyst" using a material comprising alumina, mixed zeolite, and a Ce/Zr-type oxide, and has been reported that high NO removal efficiency was obtained at such a high temperature of 550° C.

In exhaust gas from a diesel engine, as has been described in PATENT LITERATURE 1, space velocity may change in a wide range from 1 khr$^{-1}$ to 150 khr$^{-1}$. PATENT LITERATURE 1 has confirmed denitration efficiency of the SCR catalyst at a relatively low space velocity of 15 khr$^{-1}$ to 25 khr$^{-1}$, however, it is considered that denitration efficiency decreases in relatively high space velocity over this range.

In addition, in recent years, there has been such a tendency that the number of catalysts to be used in an exhaust gas purification system of a lean-burn engine increases with ever strengthening exhaust gas regulations. In particular, in the case of an automobile, which is a mobile internal combustion engine, a problem of mounting space of an apparatus, or low fuel efficiency/high output characteristics have been required to be solved. In view of these requirements, weight reduction and compact sizing per one catalyst has been required, as well as reduction of pressure loss has been necessary. PATENT LITERATURE 1 has not been performed investigation on these problems, and thus cannot be said practical as an exhaust gas purification catalyst.

CITATION LIST

Patent Literature

PATENT LITERATURE 1: JP-A-2009-538736
PATENT LITERATURE 2: JP-A-05-38420 (Claim 1, paragraphs 0012, and 0013)
PATENT LITERATURE 3: JP-A-2002-502927
NON PATENT LITERATURE 1: Catalysis Today, 114 (2006), 3-12, (page 2, left column)

SUMMARY OF INVENTION

Technical Problem

It is an object of the present invention to provide a selective reduction-type catalyst which is capable of effectively purifying nitrogen oxides contained in exhaust gas from a lean-burn engine such as a boiler, a gas turbine or a lean-burn engine such as a lean-burn-type gasoline engine, a diesel engine, even under high SV, as well as having small pressure loss, by supplying by spraying urea water or ammonia water, as a reducing component, to the selective reduction-type catalyst; and an exhaust gas purification apparatus along with an exhaust gas purification method using the same.

Solution to Problem

The present inventors have intensively studied a way to solve the above-described conventional problems and discovered that by using the SCR catalyst comprising specific zeolite and a composite oxide having specific composition consisting of silica, tungsten oxide, ceria and zirconia, as denitration components, and the composite oxide (C) consisting of titania, silica and zirconia, as needed, as an urea hydrolyzing component, nitrogen oxide components in exhaust gas discharged from a lean-burn engine comprising nitrogen oxides can be purified by urea or an ammonia aqueous solution, in high efficiency at a wide catalyst bed temperature of 150° C. to 580° C., and activity can be maintained even after heat treatment at a high temperature of about 650° C., and have thus completed the present invention.

That is, according to a first aspect of the present invention, there is provided a selective reduction-type catalyst for selectively reducing a nitrogen oxide by adding urea or ammonia as a reducing agent of the nitrogen oxide to exhaust gas discharged from a lean-burn engine, characterized by coating a catalyst layer comprising zeolite (A) comprising at least an iron element, and a composite oxide (B) consisting of silica, tungsten oxide, ceria and zirconia, as denitration components, at the surface of a monolithic structure-type substrate, wherein composition of the composite oxide (B) is silica: 20% by weight or less, tungsten oxide: 1 to 50% by weight, ceria: 1 to 60% by weight, and zirconia: 30 to 90% by weight.

In addition, according to a second aspect of the present invention, there is provided the selective reduction-type catalyst, characterized in that, in the first aspect, the composition of the composite oxide (B) is silica: 5% by weight or less, tungsten oxide: 3 to 30% by weight, ceria: 5 to 40% by weight, and zirconia: 50 to 90% by weight.

In addition, according to a third aspect of the present invention, there is provided the selective reduction-type catalyst, characterized in that, in the first aspect, the catalyst layer further comprises a composite oxide (C) consisting of titania, silica and zirconia, as a urea hydrolyzing component.

In addition, according to a fourth aspect of the present invention, there is provided the selective reduction-type catalyst, characterized in that, in the third aspect, the composition of the composite oxide (C) is titania: 70 to 95% by weight, silica: 1 to 10% by weight, and zirconia: 5 to 20% by weight.

In addition, according to a fifth aspect of the present invention, there is provided the selective reduction-type catalyst, characterized in that, in the first aspect, the zeolite (A) is a β-type zeolite (A1) and/or an MFI-type zeolite (A2), ion exchanged with iron.

In addition, according to a sixth aspect of the present invention, there is provided the selective reduction-type catalyst, characterized in that, in the first aspect, the zeolite (A) comprises an iron element in 0.1 to 5% by weight, in $Fe_2O_3$ equivalent.

In addition, according to a seventh aspect of the present invention, there is provided the selective reduction-type catalyst, characterized in that, in the first or the third aspect, the coating amount of a denitrating composition or a urea hydrolyzing component, composing the catalyst layer, is 20 to 320 g/L.

Still more, according to an eighth aspect of the present invention, there is provided the selective reduction-type catalyst, characterized in that, in the first aspect, the coating amount of the zeolite (A) is 10 to 80% by weight, relative to the whole catalyst layer.

In addition, according to a ninth aspect of the present invention, there is provided the selective reduction-type catalyst, characterized in that, in the first aspect, the coating amount of the composite oxide (B) is 20 to 90% by weight, relative to the whole catalyst layer.

In addition, according to a tenth aspect of the present invention, there is provided the selective reduction-type catalyst, characterized in that, in the first aspect, the coating amount of the composite oxide (C) is 1 to 30% by weight, relative to the whole catalyst layer.

In addition, according to an eleventh aspect of the present invention, there is provided the selective reduction-type catalyst, characterized in that, in the any one of the first to 10 aspect, at the surface of the monolithic structure-type substrate, the catalyst layer comprising the zeolite (A) comprising at least an iron element and the composite oxide (B) consisting of silica, tungsten oxide, ceria and zirconia, and optionally the composite oxide (C) consisting of titania, silica and zirconia, is coated at the upper and the lower two layers.

In addition, according to a twelfth aspect of the present invention, there is provided the selective reduction-type catalyst, characterized in that, in the eleventh aspect, the coating amount of the lower layer is 20 to 80% by weight, relative to the total, and the coating amount of the upper layer is 80 to 20% by weight, relative to the total.

In addition, according to a thirteenth aspect of the present invention, there is provided the selective reduction-type catalyst, characterized in that, in the eleventh aspect, the lower layer comprises the zeolite (A) in 50 to 90% by weight, the composite oxide (B) in 10 to 40% by weight, and the composite oxide (C) in 1 to 30% by weight.

Still more, according to a fourteenth aspect of the present invention, there is provided the selective reduction-type catalyst, characterized in that, in the eleventh aspect, the upper layer comprises the zeolite (A) in 10 to 40% by weight, the composite oxide (B) in 50 to 90% by weight, and the composite oxide (C) in 1 to 30% by weight.

On the other hand, according to a fifteenth aspect of the present invention, there is provided an exhaust gas purification apparatus, characterized in that, at a flow passage of exhaust gas, an oxidation catalyst (DOC) having oxidation function of nitrogen monoxide and hydrocarbons, a filter (DPF) for capturing and removing by combusting a particulate matter, a spray means for supplying an aqueous solution of urea or an aqueous solution of ammonia, and the selective reduction-type catalyst according to any one of claims 1 to 14, are arranged in this order.

In addition, according to a sixteenth aspect of the present invention, there is provided an exhaust gas purification method, characterized in that, using the exhaust gas purification apparatus according to claim 15, the exhaust gas discharged from a lean-burn engine is passed through the oxidation catalyst (DOC) and the filter (DPF), hydrocarbon components and carbon monoxide in exhaust gas is purified, as well as, many of nitrogen monoxide is converted to nitrogen dioxide, and then an aqueous solution of urea or an aqueous solution of ammonia is supplied by spraying, and the selective reduction-type catalyst is passed through, and nitrogen oxides in exhaust gas is reduced.

Advantageous Effects of Invention

According to the selective reduction-type catalyst of the present invention, because of comprising specific zeolite and a composite oxide having specific composition consisting of silica, tungsten oxide, ceria and zirconia, as denitration components, $NO_x$ in exhaust gas can be purified in high efficiency in a wide temperature range from a low temperature to a high temperature of, for example, 130 to 560° C. In addition, even under condition from high SV (30 k/hr to 60 k/hr) to ultra high SV (60 k/hr or higher), it is capable of purifying effectively, and is superior in heat resistance, as well as is capable of decreasing pressure loss. In this way, weight reduction and compact sizing of the SCR catalyst are possible, and thus a problem of mounting space of an automotive exhaust gas purification catalyst can be alleviated. Additionally, response to requirement towards low fuel cost and high output is possible.

DESCRIPTION OF EMBODIMENTS

Figure 1:
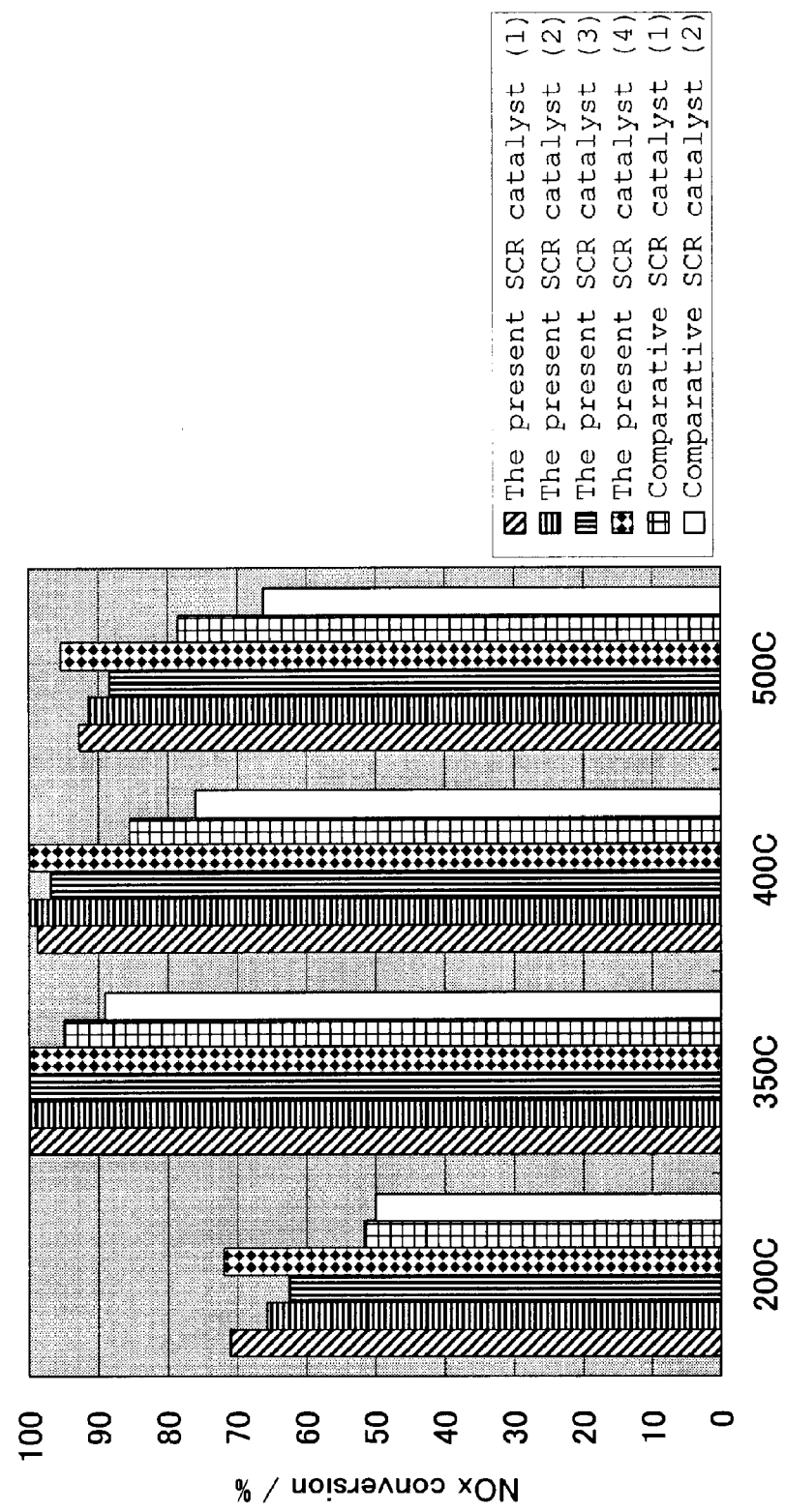
FIG. 1 is a graph, where $NO_x$ purification performance by urea using the selective reduction-type catalyst of the present invention was measured, and compared with a conventional catalyst.

Explanation will be given below on a selective reduction-type catalyst of the present invention, and an exhaust gas purification apparatus along with an exhaust gas purification method using the same.

1. The Selective Reduction-Type Catalyst

The selective reduction-type catalyst of the present invention (hereafter, it may be referred to as the present catalyst) is the selective reduction-type catalyst for selectively reducing a nitrogen oxide by adding urea or ammonia as a reducing agent of the nitrogen oxide to exhaust gas discharged from a lean-burn engine, characterized by coating a catalyst layer comprising zeolite (A) comprising at least an iron element, and a composite oxide (B) consisting of silica, tungsten oxide, ceria and zirconia, as denitration components, at the surface of a monolithic structure-type substrate, wherein composition of the composite oxide (B) is silica: 20% by weight or less, tungsten oxide: 1 to 50% by weight, ceria: 1 to 60% by weight, and zirconia: 30 to 90% by weight.

In the present invention, the zeolite (A) is a denitration component comprising at least an iron element, for example, including zeolite of the β-type or the MFI-type having a three-dimensional pore structure, there is included the zeolite such as A, X, Y, MOR, CHA, SAPO. Among them, preferable one is the β-type zeolite or the MFI-type zeolite.

β-Zeolite, which is preferable in the present invention, is represented by the following average composition formula, as a unit cell composition, and is classified as tetragonal synthetic zeolite.

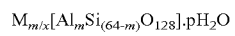

$M_{m/x}[Al_m Si_{(64-m)} O_{128}]\cdot pH_2O$ (wherein M represents a cation specie; x represents valency of the M; m represents number over 0 and below 64; and p represents number of 0 or larger)

This β-zeolite has a relatively complicated three-dimensional pore structure, composed of linear pores having relatively large diameter, aligned in one direction, and curved pores crossing with them, which makes easy diffusion of cations in ion exchange and diffusion of gas molecules of $NH_3$ and the like. In addition, as compared with mordenite, faujasite and the like, which have only linear vacant holes aligned in one direction, β-zeolite has a unique structure, and this complicated hole structure gives high stability of little structural fracture caused by heat, and is an effective material for an automotive catalyst.

In general, zeolite is necessary to have an acid point to which a basic compound such as $NH_3$ can adsorb, however, number of the acid point differs in response to Si/Al ratio thereof. Generally, zeolite having low Si/Al ratio has more number of the acid point, however, it has large deterioration degree in durability under the co-presence of steam, on the contrary, zeolite having high Si/Al ratio is superior in heat resistance. In the selective reduction catalyst of the present invention, because $NH_3$ adsorbs at the acid point of zeolite, which becomes an activated point to reductively remove a nitrogen oxide such as $NO_2$, zeolite having more acid points (lower Si/Al ratio) is advantageous in view of a denitration reaction. As an index corresponding to Si/Al ratio, molar ratio (hereafter it is abbreviated as SAR) of $SiO_2$ and $Al_2O_3$ by composition analysis is generally used. As described above, as for the SAR, there is trade off relation between durability and activity, and in consideration of this point, SAR of zeolite is preferably 15 to 300, and more preferably 17 to 60. Such characteristics is also valid similarly in the β-type zeolite and the MFI-type zeolite.

In the zeolite (A) of the present catalyst, zeolite comprising an iron element is contained as a main component. Usually, in zeolite, a cation is present as a counter ion, as a solid acid point. As the cation, an ammonium ion or a proton is general, however, the β-type zeolite to be used in the present catalyst is added with an iron element as a cation specie, which may be referred to as the "Fe-β" in the present invention.

Reason for enhancement of action of the present invention by the β-type zeolite ion-exchanged with an iron element is not clear, however, it is considered that at the zeolite surface, NO is oxidized to $NO_2$, which increases reaction activity with $NH_3$, and stabilizes a skeleton structure of zeolite, thus contributing to enhancement of heat resistance.

Addition amount of Fe to zeolite is preferably 0.1 to 5% by weight, and more preferably 0.5 to 4.5% by weight, in $Fe_2O_3$ equivalent. The amount of the iron element over 5% by weight in $Fe_2O_3$ equivalent, cannot secure number of active solid acid points, thus decreases activity. The amount of the iron element below 0.1% by weight in $Fe_2O_3$ equivalent, cannot provide sufficient purification performance of $NO_x$, decreasing purification performance of exhaust gas, and thus it is not preferable. It should be noted that, as for the iron elements to be added as an ion-exchange specie, all of them may be ion exchanged, or a part thereof may be present in an iron oxide state.

That is, a method for supporting the iron element (hereafter, it may also be referred to as a metal catalyst component) may be a method by ion-exchange or by impregnation. In the present invention, it is desirable that at least a part of zeolite is ion-exchanged with the metal catalyst component. Suitable ion exchange stabilizes a skeleton structure of zeolite and enhances heat resistance of zeolite itself. It should be noted that, as for the metal catalyst component, all of them may be ion exchanged, or a part thereof may be present in an oxide state.

A method for supporting the iron element onto zeolite is not especially limited. Such zeolite added with an iron element is commercially available as various grades from manufacturers, as well as it may be produced by a method described in JP-A-2005-502451 or the like. As a general supporting method, other than an ion-exchange method, there may also be included an impregnation method by dissolving a nitrate salt, an acetate salt, a chloride or the like, comprising an iron element, into an aqueous solution, and then by adding zeolite; a method for drying and calcination a precipitated substance obtained by adjusting pH using an alkali or the like; a method for immersing zeolite into a nitrate salt, an acetate salt, a chloride or the like, and then evaporating to dryness. Calcination temperature is preferably 300 to 800° C., and more preferably 400 to 600° C. Heating may be performed by a known heating means such as an electric furnace, a gas furnace.

As zeolite having a three-dimensional pore structure, which is preferable as the zeolite of the present catalyst, for example, the MFI-type zeolite has also been known as the SCR component. Here, Si/Al ratio of the MFI-type zeolite is similar as in the above described β-type zeolite. The MFI-type zeolite preferably comprises an iron element similarly as in the β-type zeolite. Among these, as for the MFI-type zeolite comprising an iron element, it may be referred to hereafter as the "Fe-MFI".

In addition, as zeolite species, other than the above zeolite, it may be used in combination with one or more kinds of various types of zeolite such as A, X, Y, MOR, CHA, SAPO and the like.

In the case of using the present catalyst in combination with other type of zeolite, total ratio of the above various β-type zeolite or the MFI-type zeolite in total zeolite is preferably 50 to 100%.

In addition, zeolite may include, other than the above iron element, other transition metal, rare earth metal, noble metal or the like. Specifically, there may be included a transition metal such as nickel, cobalt, zirconium, cupper, a rare earth metal such as cerium, lanthanum, praseodymium, neodymium.

In addition, a generally usable material as a catalyst material, such as a noble metal such as gold, silver, platinum, palladium, rhodium, iridium, ruthenium; an element such as niobium, tungsten, tantalum, tin, gallium; ceria, a cerium-zirconium composite oxide; a metal oxide such as a lanthanum oxide, alumina, silica, zirconia, vanadia; an alkali element, an alkaline earth element; may be added as appropriate, in a range not to inhibit objectives of the present invention.

It is preferable that, as the zeolite (A) in the present invention, zeolite comprising a Fe element is contained in 50 to 100% by weight, more preferably 60 to 100% by weight, relative to total zeolite amount. Because zeolite not comprising an iron element has low activity as SCR, increase in amount of such zeolite is not desirable.

3. The Composite Oxide (B)

The composite oxide (B) is a denitration component of the present catalyst, and is substantially an oxide composed of silica, tungsten oxide, ceria and zirconia.

In the present catalyst, composition of the composite oxide (B) is set as silica: 20% by weight or less, tungsten oxide: 1 to 50% by weight, ceria: 1 to 60% by weight, and zirconia: 30 to 90% by weight, and more preferably silica: 5% by weight or less, tungsten oxide: 3 to 30% by weight, ceria: 5 to 40% by weight, and zirconia: 50 to 90% by weight.

As for function each component in the composite oxide (B), there is something not clear, however, it is roughly considered as follows.

Silica has been known to have higher BET specific surface area as compared with various metal oxides, and increase in BET specific surface, in the composite oxide system composed of silica and other elements, has a possibility of increasing number of activated points.

In addition, ceria has been known as a material having a NO adsorption function, and by promoting NO adsorption in the present material system too, it enables to promote an SCR reaction between $NH_3$ and $NO_x$, and zirconia is expected the effect as a dispersion maintaining material to disperse highly other components in a thermally stable state.

On the other hand, an oxide of tungsten has strong acidic property and high adsorption power of urea or ammonia, which is an alkali component, and thus by using tungsten oxide, effect of enhancing denitration performance can be expected.

In the present catalyst, role of tungsten (W) among composition materials is important, and it is preferable to provide such a structure for the interface between cerium (Ce) and W to promote a DeNOx reaction. It is because of the fact that, using three kinds of material power, a W/Ce material excluding Si and Zr, a W/Zr material excluding Si and Ce, and a W/Ce/Zr material excluding Si, among Si/W/Ce/Zr materials composing the composite oxide (B), by evaluation of purification performance of model gas of ammonia-SCR, as powder itself without making a catalyst structure, the W/Ce material has higher purification performance of $NO_x$ than the W/Zr material, in comparison between the W/Ce material and the W/Zr material.

This composite oxide (B) is not especially limited by a production method, as long as it provides the above composition and structure. As just one example, the starting raw materials having a form of a nitrate salt, a sulfate salt, a carbonate salt, an acetate salt, a chloride comprising silicon, tungsten, cerium or zirconium, or the like, is solubilized into an aqueous solution all at once, and then mixed and precipitated as a precipitated substance by pH adjuster or the like or evaporated to dryness and the obtained solid substance C; or an oxide is formed by performing the above treatment on a single or a plurality of metal salts and then residual metal salts may be supported at once or sequentially.

The composite oxide (B) containing each element in an optimal composition, can be prepared by adding all elements at once to produce, or firstly by producing the powder to become a core from a single or several kinds of elements, and then by supporting residual metal salts at once or sequentially.

4. The Composite Oxide (C)

When an internal combustion engine operates in high rotation or in high load, exhaust gas becomes high temperature. Usually, at high temperature, thermal decomposition and hydrolysis of urea is promoted without assistance of a hydrolyzing component, resulting in easy progress of a denitration reaction. In addition, in the case where a reducing agent is ammonia, it may be the one, where the composite oxide (C) of a hydrolyzing component is not comprised in a catalyst layer of the present invention.

However, in the case where a reducing agent is urea, aiming at promoting the denitration reaction, by promoting generation of $NH_3$, in particular, at low temperature, it is desirable that the present catalyst contains the composite oxide (C) as a hydrolyzing component of urea component, in addition to the zeolite (A) and the composite oxide (B), which are the denitration components.

As such a hydrolyzing component, an oxide (titania, zirconia, a tungsten oxide, silica, alumina, a composite oxide thereof) comprising at least one among zirconia, tungsten oxide, silica, alumina, can be used, as needed, with titania as an essential component. In addition, these hydrolyzing components are used as the composite oxide, however, they may be used as a cluster with one or more kinds of particles selected from the above oxides, and other than this, a rare earth metal component, a transition metal component or the like may be added.

As the composition of the composite oxide (C), too high amount of titania may sometimes deteriorate heat resistance, on the other hand, too low amount decreases decomposition performance of urea and may sometimes decease catalytic activity at low temperature. In addition, in exhaust gas purification, there may be the case where arrangement of such a DPF, as will be described later, at the former stage of the present catalyst raises exhaust gas temperature over 600° C. by combustion of soot. Because titania alone may sometimes decrease activity in such a case, silica or zirconia is contained aiming at enhancing heat resistance.

Accordingly, it is preferable that the hydrolyzing component to be used in the present catalyst, that is, the composite oxide (C) is a composite oxide composed of titania, silica and zirconia. In addition, it is more preferable that the composition is titania: 70 to 95% by weight, silica: 1 to 10% by weight, and zirconia: 5 to 20% by weight.

This composite oxide (C) can be produced by a known method. That is, the starting raw materials having a form of a nitrate salt, a sulfate salt, a carbonate salt, an acetate salt, a chloride comprising titanium, silicon, or zirconium, or the like, is solubilized into an aqueous solution all at once, and then mixed and precipitated as a precipitated substance by pH adjuster or the like or evaporated to dryness and the obtained solid substance may be calcined; or an oxide is formed by performing the above treatment on a single or a plurality of metal salts and then residual metal salts may be supported at once or sequentially.

The denitration components of the present catalyst are the zeolite (A) and the composite oxide (B). In the case for attaining enhancement of denitration performance in high rotation, it is effective to increase the ratio of the denitration components in the catalyst layer.

Weight ratio of the composite oxide (C), which is the hydrolysis promoting agent, relative to the zeolite (A) and the composite oxide (B), which are the denitration components of the present catalyst, is $0/100$ to $3/7$ as $[(C)/((A)+(B))]$. It is desirable that $[(C)/((A)+(B))]$ is $0/100$ to $3/7$, and more desirably $1/50$ to $1/5$. Too high amount of the zeolite (A) or the composite oxide (B) may sometimes deteriorate decomposition performance of urea, which is the reducing component, while too low amount may sometimes deteriorate purification performance of $NO_x$.

In the present catalyst, it is effective to increase mixing ratio of the composite oxide (B) in the denitration components. As reason for that, it is considered, for example, that effect thereof is obtained by the following three factors.

Firstly, increase in mixing ratio of the composite oxide (B) in the denitration components has a possibility of enhancing gas diffusion property in the catalyst layer. As will be described later, pressure loss of the catalyst is lower in the present catalyst comprising the zeolite (A) and the composite oxide (B) than in the Comparative catalyst where the denitration component is composed of only the zeolite (A). This shows that the catalyst layer is thin. In particular, at the low temperature side, it is considered that $NH_3$ diffuses into the catalyst while repeating adsorption and desorption at solid acid points of various material surfaces comprised in the catalyst. It is considered that the uniform diffusion into the catalyst provides dispersion of the reducing agent to everywhere of the denitration component in the catalyst, resulting in increase in denitration efficiency.

In addition, secondly, it is considered as one reason that the composite oxide (B) has higher reaction rate of the denitration reaction in $NH_3$—SCR as compared with the zeolite (A). It is because of the fact that in evaluation of purification performance of model gas of $NH_3$—SCR using material powder as it is without making a catalyst structure, the composite oxide (B) has higher purification ratio of NOx as compared with the zeolite (A).

It should be noted that, based on this second idea, composing the denitration component only by the composite oxide (B), without using the zeolite (A), should provide higher denitration efficiency at high temperature and in high SV, however, it is not true actually. As the reason for this, it is possible to be related to the fact that the composite oxide (B) has lower absorption amount of $NH_3$ than the zeolite (A). It is considered that by the composite oxide (B) alone, having lower absorption amount of $NH_3$ than the zeolite (A), absorption amount of $NH_3$ for sufficiently progressing the denitration reaction is not enough, and increase in reaction chance with $NO_x$, by adsorption amount of $NH_3$ at the zeolite (A), to be present together, and re-adsorption of $NH_3$ desorbed from the zeolite (A) to the composite oxide (B), is one reason of synergy effect by combined use of the zeolite (A) and the composite oxide (B).

5. The Monolithic Structure-Type Substrate

It is preferable that the present catalyst is the one where denitration components containing at least the zeolite (A) and the composite oxide (B), are coated at the surface of the monolithic structure-type substrate, and still more the composition comprising the composite oxide (C), which is a hydrolysis promoting component of urea, is coated.

Here, the monolithic structure-type substrate is not especially limited, and is selectable from the known honeycomb structure-type substrates. As such a honeycomb structure-type substrate, there is a flow-through-type substrate, or a wall-flow-type substrate to be used in the DPF, and any of them may be usable in the present invention, however, the flow-through-type substrate is preferable in view of reduction of pressure loss.

In addition, such a honeycomb structure-type substrate has also arbitrary total shape, and selectable as appropriate in response to a structure of an exhaustion system to be applied, such as a column-type, a square pole-type, a hexagonal cylinder-type. Still more, hole number of the opening part may be decided suitably in consideration of kind of exhaust gas to be processed, gas flow amount, pressure loss or removal efficiency, however, as an application for exhaust gas purification of a diesel automobile, usually it is preferably about 100 to 1500 pieces, and more preferably 100 to 900 per square inch. The cell density per square inch of less than 100 is not able to secure contact area between exhaust gas and the catalyst, not providing sufficient purification function of exhaust gas. In addition, the cell density per square inch over 1500 generates significant pressure loss of exhaust gas.

In addition, thickness of the cell wall of such a honeycomb structure-type substrate is preferably 2 to 12 mil (milli-inch), and more preferably 3 to 8 mil (0.076 to 0.2 mm). In addition, a material of the honeycomb structure-type substrate includes a metal such as stainless steel, ceramics such as cordierite, and any of them may be used.

It should be noted that, as the monolithic structure-type substrate to be used in the present catalyst, other than the honeycomb structure-type substrate, a sheet-like structured body knitted with fine fibrous substances, or a felt-like non-inflammable structured body composed of relatively thick fibrous substances, can be used. These monolithic structure-type substrates might increase back pressure, however, because of having high supporting amount of the catalyst components, as well as large contact area with exhaust gas, there may sometimes be the case where treatment capability can be enhanced as compared with other structure-type substrates.

In the case of using the components of the present catalyst by coating at the above flow-through-type honeycomb substrate, the coating amount thereof is preferably 30 to 330 g/L, and more preferably 35 to 300 g/L as total amount of the catalyst, for a substrate having a hole number of the opening part per 1 inch$^2$ is 100 to 1500 pieces, and a thickness of cell wall of 4 to 8 mil.

In addition, it is preferable that coating amount of the zeolite (A) and the composite oxide (B) of the denitration components composing the catalyst layer, and the composite oxide (C) of the hydrolyzing component of urea, is 20 to 320 g/L, and more preferably 30 to 300 g/L. The too low coating amount may sometimes not provide sufficient denitration effect, while too high amount generates clogging of holes of the honeycomb, and significantly increases back pressure of exhaust gas, which might decrease performance of an engine.

And, it is preferable that coating amount of the zeolite (A) is 10 to 80% by weight, relative to total of the catalyst layer, coating amount of the composite oxide (B) is 20 to 90% by weight, relative to total of the catalyst layer, coating amount of the composite oxide (C) is 1 to 30% by weight, relative to total of the catalyst layer.

When it is within this range, sufficient amount of the denitration components, the zeolite (A) and the composite oxide (B), are contained relative to the composite oxide (C) of the hydrolysis promoting component, therefore large denitration effect can be obtained. It is more preferable that coating amount of the zeolite (A) is 15 to 70% by weight, relative to total of the catalyst layer, coating amount of the composite oxide (B) is 30 to 85% by weight, relative to total of the catalyst layer, coating amount of the composite oxide (C) is 2 to 20% by weight, relative to total of the catalyst layer.

The coating amount of the zeolite (A) below 10% by weight, relative to total of the catalyst layer, provides insufficient denitration performance, while even the amount over 80% by weight provides small increase in denitration performance, and thus increases cost. It is because the coating amount of the composite oxide (B) below 20% by weight, or over 90% by weight, relative to total of the catalyst layer, provides no expectation of combined effect with the zeolite (A) containing the iron element. In addition, the coating amount of the composite oxide (C) below 1% by weight, relative to total of the catalyst layer, provides insufficient decomposition performance of urea, while the amount over 30% by weight may generate a problem of deterioration of denitration performance, caused by decrease in the denitration component.

6. The Laminated Layer Structure

In addition, the present catalyst may be coated, in one layer structure, onto the monolithic structure-type substrate, however, can be coated and laminated so as to attain a two or more-layer structure. That is, it is preferable that the catalyst layer comprising the zeolite (A) having at least an iron element; the composite oxide (B) consisting of silica, tungsten oxide, ceria, and zirconia; and the composite oxide (C) consisting of titania, silica, and zirconia, is coated at the surface of the monolithic structure-type substrate, in the upper and the lower two layers.

Reason for enhancing performance by coating and laminating to attain the two or more-layer structure is considered as follows. That is, contribution of a relatively upper layer site among the catalyst layer to purification ratio of $NO_x$ at relatively low temperature becomes higher as compared with under high temperature condition, in relation to gas diffusion. On the other hand, contribution of the whole catalyst layer to purification ratio of $NO_x$ at relatively high temperature becomes higher as compared with under low temperature condition. In view of these characteristics, it is considered that arrangement of a mixture layer with the zeolite (A) having high content ratio of the catalyst composition having higher reaction rate, that is, the composite oxide (B), in the upper layer, and arrangement of a mixture layer having high ratio the zeolite (A) in the lower layer, contrary to the upper layer, to compensate for characteristics of the composite oxide (B), that is, having small adsorption amount of $NH_3$, contribute to performance enhancement.

Specifically, in the present catalyst, it is preferable that the lower layer comprises the zeolite (A) in 50 to 90% by weight, the composite oxide (B) in 10 to 40% by weight, and the composite oxide (C) in 1 to 30% by weight, on the other hand the upper layer comprises the zeolite (A) in 10 to 40% by weight, the composite oxide (B) in 50 to 90% by weight, and the composite oxide (C) in 1 to 30% by weight.

In addition, it is preferable that the coating amount of the lower layer is 20 to 80% by weight, relative to the total, and the coating amount of the upper layer is 80 to 20% by weight, relative to the total. Still more, it is more preferable that the coating amount of the lower layer is 20 to 50% by weight, relative to the total, and the coating amount of the upper layer is 80 to 5% by weight, relative to the total. In this way, by increasing coating amount of the upper layer, which contains in high concentration the composite oxide (B), which is the denitration component having fast reaction rate, relative to coating amount of the lower layer, sufficiently high denitration performance can be attained.

In making a multi-layer structure of the present catalyst, the iron element-containing zeolite to be contained in one layer, is preferably 50% by weight or higher, more preferably 80% by weight or higher, and still more preferably 90% by weight or higher, among zeolite amount of the whole present catalyst. Even when one layer contains more zeolite not containing the iron element, activity as SCR can be compensated as the whole catalyst, as long as amount of the iron element-containing zeolite to be contained in other layer, is sufficient.

Titania to be contained in the composite oxide (C), as the hydrolysis promoting component, may be present in both of the upper layer and the lower layer, however, there may also be the case, where concentration in the upper layer is higher, is preferable. It is because, in the case where urea is supplied into exhaust gas, urea diffuses from the SCR catalyst surface to the inside of the catalyst, however, when titania is contained in the upper layer, it quickly decomposes to $NH_3$, which is supplied as $NH_3$ having high reactivity with $NO_x$, in the whole SCR catalyst reaching to the lower layer, and promotes exhaust gas purification.

7. Production of the Catalyst

The present catalyst is not especially limited by the production method thereof, and it may be produced by a conventionally known method.

Firstly, as catalyst components, the zeolite (A) and the composite oxide (B), along with the zeolite (A), as needed, are prepared. After that, these catalyst components and additives such as a binder or a surfactant, as needed, are mixed with an aqueous medium to obtain a slurry-like mixture, and by coating it on the monolithic structure-type substrate, drying and calcination, the monolithic structure-type catalyst is obtained.

In obtaining the slurry-like mixture by mixing the catalyst components and an aqueous medium in predetermined ratio, the aqueous medium may be enough to be used in an amount being capable of dispersing uniformly each catalyst component in slurry. In this case, various kinds of additives can be added, as needed. As the additives, other than a surfactant to be used for adjustment of viscosity or enhancement of slurry dispersion property, an acid or an alkali for pH adjustment, a surfactant, resins for dispersion or the like can be formulated. As a mixing method for slurry, crushing mixing using a ball mill or the like may be applied, however, other crushing or mixing methods may also be applied.

Next, the slurry-like mixture is coated onto the monolithic structure-type substrate. The coating method is not especially limited, however, a wash-coat method is preferable. After the coating, by drying and calcination, the monolithic structure-type catalyst, where the composition of the present catalyst is supported, is obtained. It should be noted that drying temperature is preferably 100 to 400° C., and more preferably 100 to 300° C. In addition, calcination temperature is preferably 400 to 700° C., and more preferably 400 to 600° C. It is preferable that drying time is 0.5 to 3 hours, and calcination time is 0.5 to 3 hours. Heating may be performed by a known heating means such as an electric furnace, a gas furnace or the like.

In addition, in order to form the components of the present catalyst in a plurality of layers onto the monolithic structure-type substrate, a plurality of slurry-like mixtures are prepared and the above operation may be repeated twice or more. In this case, after coating twice by a wash-coat method, drying and calcination may be performed, or after coating by a wash-coat method, drying is performed, and after coating the second or the subsequent layers thereon, the drying and calcination may be performed.

8. The Exhaust Gas Purification Apparatus

The exhaust gas purification apparatus is characterized in that at a flow passage of exhaust gas, the oxidation catalyst (DOC) having oxidation function of nitrogen monoxide and hydrocarbons, the filter (DPF) for capturing and removing by combusting a particulate matter, the spray means for supplying the aqueous solution of urea or the aqueous solution of ammonia, and the selective reduction-type catalyst are arranged in this order.

A diesel engine has relatively low temperature of exhaust gas as compared with a gasoline engine, from structural characteristics thereof, and the temperature thereof is about from room temperature to 700° C. In particular, in start-up or in low load, temperature of exhaust gas is low. However, in the case where temperature of exhaust gas is low, also temperature of the catalyst is not increased sufficiently, which provides insufficient fulfilling of purification performance, and $NO_x$ in exhaust gas tends not to be purified sufficiently and discharged.

In purification of $NO_x$ in exhaust gas, it is desirable that exhaust gas is contacted with the SCR catalyst in a state that ratio of NO and $NO_2$ in exhaust gas is in a state of 1:1. It is because it provides the fastest reaction rate of the above denitration reaction equation (3). Accordingly, as the oxidation means, where NO oxidation function is arranged at the former stage of the present catalyst to exhaust gas flow, the oxidation catalyst (DOC) for oxidizing HC and NO in exhaust gas, or the filter (DPF) for capturing combustible particulate components comprised in exhaust gas, is arranged.

As the oxidation catalyst, such a catalyst can be used that contains, as a main component, activated alumina, where at least one kind among known platinum or palladium is supported. It should be noted that, as the oxidation catalyst thereof, activated alumina containing La can also be used. Still more, a catalyst containing the β-type zeolite ion-exchanged with cerium may also be used.

In this way, it is preferable that the DOC comprises a platinum component or a palladium component as a noble metal component, and amount of this noble metal component is preferably 0.1 to 4 g/L, and more preferably 0.5 to 3 g/L, in metal equivalent. Too high content of the noble metal component results in high cost, while too low content may sometimes not provide suitable $NO_2/NO_x$ ratio.

In addition, it is preferable that this noble metal component comprises 30 to 100% by weight of platinum, and more preferably 50 to 100% by weight of platinum, in metal equivalent. Because light oil to be used as fuel of a diesel automobile contains a sulfur component, the noble metal to be contained in the catalyst component may be poisoned by exhaust gas. On the other hand, palladium of the noble metal component has been known to be easily poisoned by sulfur, while platinum has been known to be difficult to be poisoned by sulfur. Accordingly, as the DOC to be used in the present invention, use of platinum, as a main component of the noble metal component, is preferable.

The present SCR catalyst is arranged at the later stage of these DOC and DPF. A combustion engine, to which the present invention is applied, in the case of a diesel engine, is from a small-size automobile having a displacement of about 1 L to a heavy duty diesel engine having a displacement of over 50 L, and NOx in exhaust gas discharged from these diesel engines differs largely depending on an operation state or a combustion control method or the like. In addition, the SCR catalyst for purification of $NO_x$ in exhaust gas from these diesel engines may also be selected in response to versatility of displacement of the diesel engines from about 1 L to over 50 L.

It should be noted that combustible particulate components captured by the DPF are removed by combustion thereafter to regenerate DPF function. In combustion of soot in the DPF, $NO_2$ may be used sometimes. Combustion of soot by $NO_2$ is moderate as compared with oxygen, and thus fracture of the DPF caused by combustion heat is difficult to be induced. In the DPF, there is the one coated with an oxidation catalyst aiming at promoting this combustion regeneration, and is called, CSF (Catalyzed Soot Filter). In the present method, unless otherwise specified, the DPF should encompass the CSF coated with such an oxidation catalyst.

In addition, as a means for purifying $NO_x$ in exhaust gas, there may be the case using $NO_x$ storage catalyst, other than the SCR of the present method, which is called an LNT (Lean $NO_x$ Trap). $NO_x$ storaged in the LNT purifies $NO_x$ using HC or CO, in exhaust gas as a reducing agent, and the present method may be combined with such an LNT.

9. The Exhaust Gas Purification Method

The exhaust gas purification method is characterized in that, using the exhaust gas purification apparatus, the exhaust gas discharged from a lean-burn engine is passed through the oxidation catalyst (DOC) and the filter (DPF), hydrocarbon components and carbon monoxide in exhaust gas is purified, as well as, many of nitrogen monoxide is converted to nitrogen dioxide, and then an aqueous solution of urea or an aqueous solution of ammonia is supplied by spraying, and the selective reduction-type catalyst is passed through, and nitrogen oxides in exhaust gas is reduced.

In purification of $NO_x$ in exhaust gas, it is desirable that exhaust gas is contacted with the SCR catalyst in a state that ratio of NO and $NO_2$ is in a state of 1:1, by increasing concentration of $NO_2$ in exhaust gas. It is because of increasing contribution of the above reaction equation (3), and performing purification of $NO_x$ efficiently in a wide temperature range of from a low temperature to a high temperature of 130 to 560° C. In addition, according to the present invention, because the selective reduction-type catalyst has a specific component composition, effective purification can be performed not only under a space velocity of lower than 30 k/hr but also from high SV (30 k/hr to 60 k/hr) to ultra high SV (60 k/hr or higher), and heat resistance is superior, as well as pressure loss can be reduced.

When urea water is used as a reducing agent in the present invention, urea water is decomposed by the present catalyst to generate $NH_3$, which reacts with $NO_x$. It is desirable to generate ammonia in a ratio of $[NH_3/NO_x=0.5$ to $1.5]$, in ammonia equivalent, relative to $NO_x$ in exhaust gas. However, there may be the case where all $NH_3$ is not necessarily used in purification of $NO_x$, depending on a situation. In this case, $NH_3$ not consumed in purification of $NO_x$ slips the SCR catalyst and is discharged. Even in this case, according to the present invention, because of small amount of slipping $NH_3$ as compared with a conventional urea SCR, it can be easily dealt with by using a small $NH_3$ oxidation catalyst or a $NH_3$ oxidation catalyst having low noble metal amount.

EXAMPLES

Characteristics of the present invention will be made further clearer below by showing Examples and Comparative examples, however, the present invention should not be limited to aspects of these Examples. It should be noted that catalyst to be used in the present Examples and Comparative Examples are prepared by a method to be shown next.

[Production of the Present SCR Catalyst (1)]

A hydrolyzing component of urea, that is, 54 g of the composite oxide (C) (87% by weight of $TiO_2$/10% by weight of $ZrO_2$/3% by weight of $SiO_2$) was prepared, and concentration thereof was adjusted with water, and milled using a ball mill to obtain predetermined particle diameter.

While stirring the slurry of the composite oxide (C) with a stirrer, water, 60% nitric acid aqueous solution, the composite oxide (B), that is, 679 g of a Si/W/Ce/Zr-type material (1% by weight of $SiO_2$/10% by weight of $WO_3$/23% by weight of $CeO_2$/66% by weight of $ZrO_2$) and next the zeolite (A), that is, 232 g of Fe-ion-exchanged zeolite (Fe-ion-exchanged amount; 2.2% by weight, in $Fe_2O_3$ equivalent, BEA-type, SAR=26), 60 g of pore-forming particles, and 36 g of a binder were charged sequentially to obtain slurry for coating.

Subsequently, a monolithic structure-type substrate, specifically, a honeycomb flow-through-type cordierite substrate (300 cells, 5 mil, a diameter of 9 inch, a length of 7 inch), was immersed in slurry for coating, and coated 280 g of the catalyst components per unit volume of the monolithic structure-type substrate, by a wash-coat method, and pre calcination at 350° C. for 4 hours under atmospheric environment, and then subjected to calcination treatment at 450° C. for 1 hour.

Catalyst amount per unit volume, along with composition of the resultant present SCR catalyst (1) are shown in Table 1. It should be noted that numerical values in Table 1 represent supporting amount [g/L] per unit volume of the honeycomb flow-through-type cordierite substrate.

[Production of the Present SCR Catalyst (2)]

A hydrolyzing component of urea, that is, 54 g of the composite oxide (C) (87% by weight of $TiO_2$/10% by weight of $ZrO_2$/3% by weight of $SiO_2$) was prepared, and charged into a ball mill to obtain predetermined particle diameter.

Subsequently, while stirring of slurry of the composite oxide (C) with a stirrer, water, 60% nitric acid aqueous solution, the composite oxide (B), that is, 679 g of a Si/W/Ce/Zr-type material (1% by weight of $SiO_2$/10% by weight of $WO_3$/23% by weight of $CeO_2$/66% by weight of $ZrO_2$) and next the zeolite (A), that is, 232 g of Fe-ion-exchanged zeolite (Fe-ion-exchanged amount; 4.0% by weight, in $Fe_2O_3$ equivalent, MFI-type, SAR=27), 66 g of pore-forming particles, and 36 g of a binder were charged sequentially.

A monolithic structure-type substrate, that is, a honeycomb flow-through-type cordierite substrate (300 cells, 5 mil, a diameter of 9 inch, a length of 7 inch), was immersed in the slurry for coating, and coated 280 g of the catalyst components per unit volume of the monolithic structure-type substrate, by a wash-coat method. After that it was pre calcination at 350° C. for 4 hours under atmospheric environment, and then subjected to calcination treatment at 450° C. for 1 hour.

Catalyst amount per unit volume, along with composition of the resultant present SCR catalyst (2) are shown in Table 1.

[Production of the Present SCR Catalyst (3)]

A hydrolyzing component of urea, that is, 54 g of the composite oxide (C) (87% by weight of $TiO_2$/10% by weight of $ZrO_2$/3% by weight of $SiO_2$) was prepared, and charged into a ball mill to obtain predetermined particle diameter.

Subsequently, into this slurry, the zeolite (A), that is, 357 g of Fe-ion-exchanged zeolite (Fe-ion-exchanged amount; 2.2% by weight, in $Fe_2O_3$ equivalent, BEA-type, SAR=26) and 321 g of Fe-ion-exchanged zeolite (Fe-ion-exchanged amount; 4.0% by weight, in $Fe_2O_3$ equivalent, MFI-type, SAR=27), next the composite oxide (B), that is, 232 g of a Si/W/Ce/Zr-type material (1% by weight of $SiO_2$/10% by weight of $WO_3$/23% by weight of $CeO_2$/66% by weight of $ZrO_2$) and 36 g of a binder were charged sequentially to obtain slurry for coating.

Subsequently, a monolithic structure-type substrate, that is, a honeycomb flow-through-type cordierite substrate (300 cells, 5 mil, a diameter of 9 inch, a length of 7 inch), was immersed in slurry for coating, and coated 280 g of the catalyst components per unit volume of the monolithic structure-type substrate, by a wash-coat method. After that it was subjected to calcination treatment at 550° C. for 30 minutes under atmospheric environment.

Catalyst amount per unit volume, along with composition of the resultant present SCR catalyst (3) are shown in Table 1.

[Production of the Present SCR Catalyst (4)]

=a Lower Layer (Bottom)=

Firstly, a hydrolyzing component of urea, that is, 54 g of the composite oxide (C) (87% by weight of $TiO_2$/10% by weight of $ZrO_2$/3% by weight of $SiO_2$) was prepared, and charged into a ball mill to obtain predetermined particle diameter.

Subsequently, into this slurry, the zeolite (A), that is, 357 g of Fe-ion-exchanged zeolite (Fe-ion-exchanged amount; 2.2% by weight, in $Fe_2O_3$ equivalent, BEA-type, SAR=26) and 321 g of Fe-ion-exchanged zeolite (Fe-ion-exchanged amount; 4.0% by weight, in $Fe_2O_3$ equivalent, MFI-type, SAR=27), next the composite oxide (B), that is, 232 g of a Si/W/Ce/Zr-type material (1% by weight of $SiO_2$/10% by weight of $WO_3$/23% by weight of $CeO_2$/66% by weight of $ZrO_2$) and 36 g of a binder were charged sequentially to obtain slurry for coating.

After that, a monolithic structure-type substrate, that is, a honeycomb flow-through-type cordierite substrate (300 cells, 5 mil, a diameter of 9 inch, a length of 7 inch), was immersed in this slurry for coating, and coated 112 g of the catalyst components per unit volume of the monolithic structure-type substrate, by a wash-coat method. After that it was subjected to calcination treatment at 550° C. for 30 minutes under atmospheric environment to obtain a lower layer coated product.

=An Upper Layer (Top)=

Firstly, a hydrolyzing component of urea, that is, 54 g of the composite oxide (C) (87% by weight of $TiO_2$/10% by weight of $ZrO_2$/3% by weight of $SiO_2$) was prepared, and charged into a ball mill to obtain predetermined particle diameter.

Subsequently, while stirring of slurry of the composite oxide (C) with a stirrer, water, 60% nitric acid aqueous solution, the composite oxide (B), that is, 679 g of a Si/W/Ce/Zr-type material (1% by weight of $SiO_2$/10% by weight of $WO_3$/23% by weight of $CeO_2$/66% by weight of $ZrO_2$) and next the zeolite (A), that is, 232 g of Fe-ion-exchanged zeolite (Fe-ion-exchanged amount; 4.0% by weight, in $Fe_2O_3$ equivalent, MFI-type, SAR=27), 66 g of pore-forming particles, and 36 g of a binder were charged sequentially.

After that, slurry of the composite oxide (C) was coated on the above lower layer by a wash-coat method. In this way, by coating 168 g of the catalyst components per unit volume of the monolithic structure-type substrate, then it was subjected to preliminarily heating at 350° C. for 4 hours under atmospheric environment, and then calcination treatment at 450° C. for 1 hour to obtain an SCR (4).

Catalyst amount per unit volume, along with composition of the resultant present SCR catalyst (4) are shown in Table 1.

[Production of a Comparative SCR Catalyst (1)]

A comparative SCR catalyst (1) was obtained by substituting the above-described composite oxide (B) of the present SCR catalyst (3) with the BEA-type zeolite (A), as well as by substituting the composite oxide (C) with a titanium-silicon composite oxide (Si content in $SiO_2$ equivalent; 10% by weight, BET value; 100 m²/g).

Catalyst amount [g/L] per unit volume, along with composition of the resultant each Comparative SCR catalyst are shown in Table 1, similarly as in the present SCR catalyst (1).

[Production of Comparative SCR Catalyst (2)]

As a hydrolyzing component, 54 g of the titanium-silicon composite oxide (C) (silicon content in $SiO_2$ equivalent; 10% by weight, BET value; 100 m²/g), 696 g of Fe-ion-exchanged zeolite (Fe-ion-exchanged amount; 2.2% by weight, in $Fe_2O_3$ equivalent, BEA-type, SAR=26) and 179 g of Fe-ion-exchanged zeolite (Fe-ion-exchanged amount; 4.0% by weight, in $Fe_2O_3$ equivalent, MFI-type, SAR=27), 71 g of a binder and water were charged and milled in a ball mill to obtain slurry for coating.

Subsequently, a monolithic structure-type substrate, specifically, a honeycomb flow-through-type cordierite substrate (300 cells, 5 mil, a diameter of 9 inch, a length of 7 inch), was immersed in the slurry for coating, and coated 280 g of the catalyst components per unit volume of the monolithic structure-type substrate, by a wash-coat method, and then subjected to calcination treatment at 450° C. for 1 hour under atmospheric environment.

Catalyst amount [g/L] per unit volume, along with composition of the resultant Comparative SCR catalyst (2) are shown in Table 1, similarly as in the present SCR catalyst (1).

TABLE 1

Values in this Table represent [g/L] unless otherwise specified

| | | | Present SCR Catalyst (1) | Present SCR Catalyst (2) | Present SCR Catalyst (3) | Present SCR Catalyst (3) Top | Present SCR Catalyst (3) Bottom | Comparative SCR Catalyst (1) | Comparative SCR Catalyst (2) |
|---|---|---|---|---|---|---|---|---|---|
| Denitration component | Zeolite (A) | FeBEA-type | 65 | | 100 | | 40 | 165 | 195 |
| | | FeMFI-type | | 65 | 90 | 39 | 36 | 90 | 50 |
| | Composite oxide (B) | | 190 | 190 | 65 | 114 | 26 | | |
| Material for hydrolysis | Composite oxide (C) | not containing $ZrO_2$ | | | | | | 15 | 15 |
| | | containing $ZrO_2$ | 15 | 15 | 15 | 9 | 6 | | |
| Binder component | | | 10 | 10 | 10 | 6 | 4 | 10 | 20 |
| Catalyst supporting amount (by layer) | | | 280 | 280 | 280 | 168 | 112 | 280 | 280 |

TABLE 1-continued

Values in this Table represent [g/L] unless otherwise specified

| | | Present SCR Catalyst (1) | Present SCR Catalyst (2) | Present SCR Catalyst (3) | Present SCR Catalyst (3) | | Comparative SCR Catalyst (1) | Comparative SCR Catalyst (2) |
|---|---|---|---|---|---|---|---|---|
| | | | | | Top | Bottom | | |
| Catalyst supporting amount (total) | | 280 | 280 | 280 | 280 | | 280 | 280 |
| Coating amount Ratio [wt %] of zeolite (A) | in each layer | 23.2 | 23.2 | 67.9 | 23.2 | 67.9 | 91.1 | 87.5 |
| Coating amount Ratio [wt %] of composite oxide (B) | | 67.9 | 67.9 | 23.2 | 67.9 | 23.2 | 0.0 | 0.0 |
| Coating amount Ratio [wt %] of composite oxide (C) | | 5.4 | 5.4 | 5.4 | 5.4 | 5.4 | 5.4 | 5.4 |

Examples 1 to 4 and Comparative Examples 1 to 2

Figure 2:
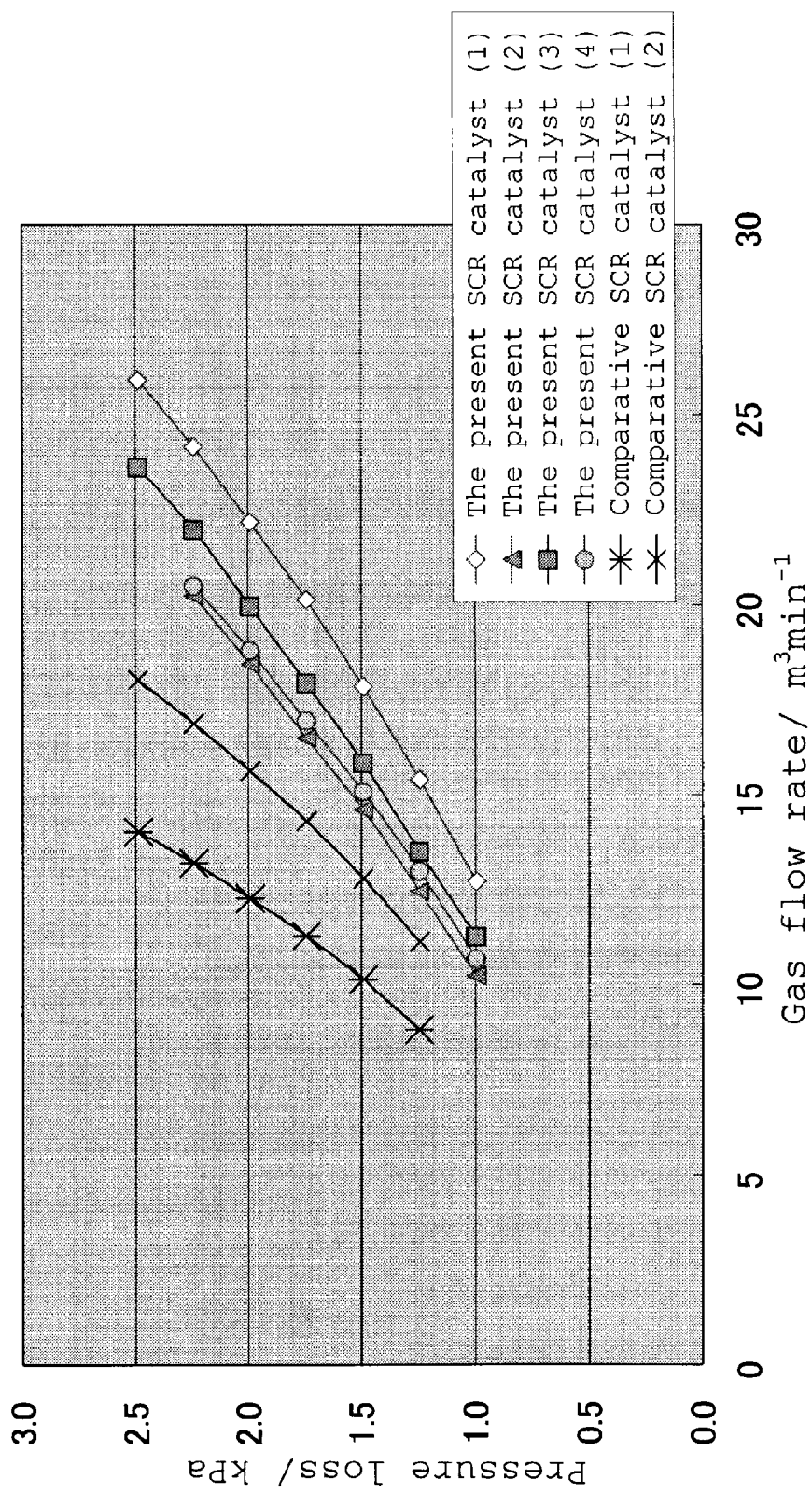
FIG. 2 is a graph, where pressure loss was measured using the selective reduction-type catalyst of the present invention, and compared with a conventional catalyst.

On the present SCR catalysts (1) to (4) obtained as above, purification performance of $NO_x$ and pressure loss were measured under the following measurement condition. In addition, also on Comparative SCR catalysts (1) and (2), similar experiment was performed to compare performance. It should be noted that, in measurement of pressure loss, trade name: Super Flow, manufactured by Colorado Springs Co., Ltd., was used. Results are shown in FIGS. 1 and 2.

<Measurement Condition>

Engine: a 5 L diesel engine

Reducing component: a 32.5% by weight urea aqueous solution

Spray amount of urea water: ratio of $NH_3/NO_x$ in exhaust gas was controlled at 1.0

Heat treatment condition of catalysts: 630° C.×50 hours, in air flow comprising 10% by volume of steam Floor temperature of catalysts and SV: refer to Table 2

TABLE 2

| Catalyst bed temperature (° C.) | SV (h$^{-1}$) |
|---|---|
| 200 | 32000 |
| 350 | 44000 |
| 400 | 50000 |
| 500 | 82000 |

[Evaluation]

By comparing Examples using the present SCR catalysts (1) to (4) and Comparative Examples using Comparative SCR catalysts (1) to (2), the following can be understood.

That is, as shown in FIG. 1, any of the selective reduction-type catalysts of the present invention, the present SCR catalyst (1) to (4), is superior in purification performance of $NO_x$, as compared with a conventional type Comparative SCRs (1) and (2). In addition, as shown in FIG. 2, it has small and superior pressure loss. In addition, it can be understood that performance of the present SCR catalyst (4) has highest purification performance of $NO_x$, when compared with the present SCR catalysts (1) to (3).

INDUSTRIAL APPLICABILITY

The present invention is usable to purification technology of $NO_x$ generating by lean-burn, moving body applications, for example, a diesel automobile, a gasoline automobile, ships and the like, stationary applications such as a power generator, and the like.

The invention claimed is:

1. A selective reduction-type catalyst for selectively reducing a nitrogen oxide by adding urea or ammonia as a reducing agent of the nitrogen oxide to exhaust gas discharged from a lean-burn engine, characterized by coating a catalyst layer comprising a zeolite (A) comprising at least an iron element, and a composite oxide (B) consisting of silica, tungsten oxide, ceria and zirconia, as denitration components, at the surface of a monolithic structure-type substrate, wherein composition of the composite oxide (B) is silica: 20% by weight or less, tungsten oxide: 1 to 50% by weight, ceria: 1 to 60% by weight, and zirconia: 30 to 90% by weight.

2. The selective reduction-type catalyst according to claim 1, characterized in that the composition of the composite oxide (B) is silica: 5% by weight or less, tungsten oxide: 3 to 30% by weight, ceria: 5 to 40% by weight, and zirconia: 50 to 90% by weight.

3. The selective reduction-type catalyst according to claim 1, characterized in that the catalyst layer further comprises a composite oxide (C) consisting of titania, silica and zirconia, as a urea hydrolyzing component.

4. The selective reduction-type catalyst according to claim 3, characterized in that the composition of the composite oxide (C) is titania: 70 to 95% by weight, silica: 1 to 10% by weight, and zirconia: 5 to 20% by weight.

5. The selective reduction-type catalyst according to claim 1, characterized in that the zeolite (A) is β-type zeolite (A1) and/or an MFI-type zeolite (A2), ion exchanged with iron.

6. The selective reduction-type catalyst according to claim 1, characterized in that the zeolite (A) compress an iron element in 0.1 to 5% by weight, in $Fe_2O_3$ equivalent.

7. The selective reduction-type catalyst according to claim 1 or 3, characterized in that the coating amount of a denitration composition or a urea hydrolyzing component, composing the catalyst layer, is 20 to 320 g/L.

8. The selective reduction-type catalyst according to claim 1, characterized in that the coating amount of the zeolite (A) is 10 to 80% by weight, relative to the whole catalyst layer.

9. The selective reduction-type catalyst according to claim 1, characterized in that the coating amount of the composite oxide (B) is 20 to 90% by weight, relative to the whole catalyst layer.

10. The selective reduction-type catalyst according to claim 1, characterized in that the coating amount of the composite oxide (C) is 1 to 30% by weight, relative to the whole catalyst layer.

11. The selective reduction-type catalyst according to claim 1 or 3, characterized in that, at the surface of the monolithic structure-type substrate, the catalyst layer comprising the zeolite (A) comprising at least an iron element and the composite oxide (B) consisting of silica, tungsten oxide, ceria and zirconia, and optionally the composite oxide (C) consisting of titania, silica and zirconia, is coated at the upper and the lower two layers.

12. The selective reduction-type catalyst according to claim 11, characterized in that the coating amount of the lower layer is 20 to 80% by weight, relative to the total, and the coating amount of the upper layer is 80 to 20% by weight, relative to the total.

13. The selective reduction-type catalyst according to claim 11, characterized in that the lower layer comprises the zeolite (A) in 50 to 90% by weight, the composite oxide (B) in 10 to 40% by weight, and the composite oxide (C) in 1 to 30% by weight.

14. The selective reduction-type catalyst according to claim 11, characterized in that the upper layer comprises the zeolite (A) in 10 to 40% by weight, the composite oxide (B) in 50 to 90% by weight, and the composite oxide (C) in 1 to 30% by weight.

15. An exhaust gas purification apparatus, characterized in that, at a flow passage of exhaust gas, an oxidation catalyst (DOC) having oxidation function of nitrogen monoxide and hydrocarbons, a filter (DPF) for capturing and removing by combusting a particulate matter, a spray means for supplying an aqueous solution of urea or an aqueous solution of ammonia, and the selective reduction-type catalyst according to claim 1 or 3, are arranged in this order.

16. An exhaust gas purification method, characterized in that, using the exhaust gas purification apparatus according to claim 15, the exhaust gas discharged from a lean-burn engine is passed through the oxidation catalyst (DOC) and the filter (DPF), hydrocarbon components and carbon monoxide in exhaust gas is purified, as well as, many of nitrogen monoxide is converted to nitrogen dioxide, and then an aqueous solution of urea or an aqueous solution of ammonia is supplied by spraying, and the selective reduction-type catalyst is passed through, and nitrogen oxides in exhaust gas is reduced.

* * * * *